(12) United States Patent
Core

(10) Patent No.: US 8,733,087 B2
(45) Date of Patent: May 27, 2014

(54) LIQUID DRAIN SYSTEM

(75) Inventor: Phillip R. Core, West Yorkshire (GB)

(73) Assignee: Parker-Hannifin (UK) Ltd., Hemel Hempstead (GB)

( * ) Notice: Subject to any disclaimer, the term of this patent is extended or adjusted under 35 U.S.C. 154(b) by 735 days.

(21) Appl. No.: 12/966,028

(22) Filed: Dec. 13, 2010

(65) Prior Publication Data

US 2011/0088800 A1 Apr. 21, 2011

Related U.S. Application Data

(63) Continuation of application No. PCT/GB2009/050567, filed on May 26, 2009.

(30) Foreign Application Priority Data

Jun. 18, 2008 (GB) .................................. 0811144.5
Dec. 2, 2008 (GB) .................................. 0821889.3

(51) Int. Cl.
*F01N 3/02* (2006.01)
*F01N 3/00* (2006.01)
*F01N 3/10* (2006.01)

(52) U.S. Cl.
USPC ................... 60/309; 60/274; 60/286; 60/303; 137/512

(58) Field of Classification Search
USPC ............ 60/274, 309; 137/512, 533.11, 513.3, 137/513.5
See application file for complete search history.

(56) References Cited

U.S. PATENT DOCUMENTS

| 3,961,477 A | 6/1976 | Grieshaber et al. |
| 4,019,869 A | 4/1977 | Morris |

(Continued)

FOREIGN PATENT DOCUMENTS

| DE | 10334042 | 2/2005 |
| DE | 102004046887 | 3/2006 |

(Continued)

OTHER PUBLICATIONS

Notification Concerning Transmittal of International Preliminary Report on Patentability and Written Opinion of the International Searching Authority dated Dec. 29, 2010 in corresponding International Application No. PCT/GB2009/050567.

(Continued)

*Primary Examiner* — Thomas Denion
*Assistant Examiner* — Diem Tran
(74) *Attorney, Agent, or Firm* — Christopher H. Hunter

(57) ABSTRACT

A drain system and method for draining a first liquid, including a collection vessel having a first chamber arranged to receive the first liquid, a second chamber, and higher and lower valves positioned between the first and second chambers. When the valves are open, liquids can pass between the chambers. When the pressure in the second chamber exceeds that in the first chamber by more than a first predetermined amount, the valves are closed. A first outlet to the second chamber allows liquids to flow from the second chamber. In a first mode, the first inlet supplies a second liquid at a pressure higher than that of the first liquid in the first chamber such that the valves are closed. In a second mode, the first inlet stops supplying the second liquid such that the pressure in the second chamber reduces relative to the first chamber allowing the valves open.

19 Claims, 3 Drawing Sheets

(56) References Cited

U.S. PATENT DOCUMENTS

| | | | |
|---|---|---|---|
| 4,334,989 A * | 6/1982 | Hall | 210/114 |
| 4,420,392 A | 12/1983 | Harris | |
| 4,539,109 A * | 9/1985 | Davis | 210/104 |
| 4,637,351 A * | 1/1987 | Pakula | 123/25 J |
| 5,053,120 A * | 10/1991 | Mollmann | 210/86 |
| 5,462,658 A * | 10/1995 | Sem | 210/172.1 |
| 5,564,283 A | 10/1996 | Yano et al. | |
| 5,788,859 A * | 8/1998 | Biere | 210/312 |
| 6,237,329 B1 | 5/2001 | Mizuno | |
| 6,314,919 B1 | 11/2001 | Pugschev | |
| 6,497,095 B2 | 12/2002 | Carberry et al. | |
| 6,497,846 B1 | 12/2002 | Okada et al. | |
| 6,644,020 B2 | 11/2003 | Kuenstler | |
| 6,668,548 B1 | 12/2003 | Asanuma et al. | |
| 6,823,663 B2 | 11/2004 | Hammerle et al. | |
| 6,898,508 B2 | 5/2005 | Nakano et al. | |
| 6,907,873 B2 | 6/2005 | Hamahata | |
| 7,117,667 B2 | 10/2006 | Mital et al. | |
| 7,117,668 B2 | 10/2006 | Nashburn et al. | |
| 7,134,405 B2 | 11/2006 | Vincent et al. | |
| 7,147,110 B2 | 12/2006 | Clausen et al. | |
| 2004/0037755 A1 | 2/2004 | Mital et al. | |
| 2004/0200453 A1 | 10/2004 | Abo et al. | |
| 2005/0076636 A1 | 4/2005 | Nashburn et al. | |
| 2005/0178110 A1 | 8/2005 | Mital et al. | |
| 2006/0086649 A1 | 4/2006 | Wieczorek et al. | |
| 2006/0144039 A1 | 7/2006 | Rigaudeau | |
| 2006/0254535 A1 | 11/2006 | Valentine et al. | |
| 2006/0272597 A1 | 12/2006 | Burrington et al. | |
| 2007/0131193 A1 | 6/2007 | Takahashi | |
| 2007/0175206 A1 | 8/2007 | Mital et al. | |
| 2007/0256407 A1 | 11/2007 | Reuter | |
| 2008/0016851 A1 | 1/2008 | McCarthy et al. | |
| 2008/0053070 A1 | 3/2008 | Hatton | |
| 2008/0098730 A1 | 5/2008 | Owens | |
| 2008/0190109 A1 | 8/2008 | Kardos et al. | |

FOREIGN PATENT DOCUMENTS

| | | |
|---|---|---|
| DE | 10 2006 046 752 A1 | 4/2007 |
| DE | 102006 046 752 A1 | 4/2007 |
| EP | 1319824 | 6/2003 |
| EP | 1 612 397 A | 1/2006 |
| EP | 1 612 397 A2 | 1/2006 |
| FR | 2 533 667 | 3/1984 |
| GB | 2241443 | 9/1991 |
| WO | 84/04051 | 10/1984 |
| WO | 2004/007942 | 1/2004 |
| WO | 2004079168 | 9/2004 |

OTHER PUBLICATIONS

The International Search Report in corresponding International Application No. PCT/GB2009/050567.

The UK Search Report in corresponding Great Britain Patent Application No. GB0811144.5.

* cited by examiner

LIQUID DRAIN SYSTEM

CROSS REFERENCE TO RELATED APPLICATIONS

This application is a continuation of co-pending International Application No. PCT/GB2009/050567, filed May 26, 2009, which designated the United States, the disclosure of which is incorporated herein by reference, and which claims priority to Great Britain Patent Application No. GB-0811144.5, filed Jun. 18, 2008 and Great Britain Patent Application No. GB-0821889.3, filed Dec. 2, 2008.

BACKGROUND OF THE INVENTION

The present invention relates to a liquid drain system. In particular, the present invention relates to a water drain system for removing water separated in a fuel filter within a liquid fuel supply system. The fuel supply system may in particular be part of a vehicle, and more particularly, a diesel truck.

Fuel supply systems, and in particular vehicle fuel systems generally comprise at least one fuel filter to remove water and other contaminants from the fuel. For medium and heavy duty trucks, there is generally a need for multiple fuel filters, for instance a pre-filter for separating out water on the suction side (that is, upstream of the main fuel pump) and for removing large particulate contaminants and a final filter for removing fine particles on the pressure side (that is, downstream of the main fuel pump). It is generally necessary to continuously or periodically remove the separated water from the fuel filter in order to prevent water passing through the filter element into the fuel system and therefore reaching the engine injector nozzles. The filter media also needs to be changed at the regular intervals as it becomes clogged by contaminants leading to high pressure drop across the primary filter.

It is possible to filter water from the fuel supply and extract the water on the pressure side. However, it is undesirable to do so as the main fuel pump is not protected from the presence of water in the fuel supply. Additionally, due to the increased flow rates on the pressure side, water separation is more difficult and consequently the fuel filter and the water drain may be more expensive. If water is to be separated on the pressure side then water may be drained using a solenoid fuel drain valve. As the separated water is pressurised by the pressurised fuel, the solenoid fuel drain valve requires no additional pressurisation or air inlet in order to function.

It is generally more cost effective and efficient to separate water from fuel on the suction side (that is, the portion of the fuel system that is not pressurised as it is upstream of the main fuel pump). This is particularly the case for diesel applications. Draining of the separated water on the suction side may either be done manually or automatically using a solenoid fuel drain valve. Known manual fuel drain valves for fuel filters on the suction side allow water which has been separated from the fuel supply to be released. The water may either be collected in a separate receptacle or allowed to drain away. The operator of a manual fuel drain valve periodically releases the water, and any other contaminants present, by rotating the manual drain valve. If during water draining operation the primary fuel filter is not pressurised by an additional pump (for instance a priming pump), a manual self-venting valve may be used. Water drains through a first hole as air enters the fuel filter through a second hole in the valve.

Manual water drain systems are frequently positioned in a position within the engine bay which is not easily accessed. Additionally, manual draining of water is inconvenient for the operator and if neglected can cause water to pass through the fuel filter media and enter the fuel system causing damage to the engine injector nozzles thereby reducing life of the engine.

As an alternative to manual water drain systems, solenoid activated water drain valves have been developed. Solenoid fuel drain valves are electrically operated. Operation may be controlled manually, for instance by activation of a switch within the vehicle cabin by the operator of the vehicle in response to a warning signal that water is present in the fuel filter. A problem associated with some conventional types of solenoid fuel drain valves is that the primary filter needs to be pressurised in order to expel water through the valve. This requires the provision of an additional electrical pump, which increases the cost of the filter.

PCT patent publication number WO-2004/007942 discloses an improved solenoid water drain valve which needs not be positioned below the fuel tank to provide the necessary pressurisation, and is not provided with separate pressurisation means. The solenoid fuel drain valve is arranged to be operated when the engine is not in operation to allow water and other contaminants to flow from the fuel filter. Air vent holes are provided within the solenoid valve allowing for self venting in which as water drains away it is replaced by air. If the filtering system is generally under suction, the improved solenoid water drain valve operates by reducing and ultimately eliminating the pressure differential between the water collection vessel and the ambient environment thereby enabling the valve to drain. Even in the presence of pressure within the filter, and therefore a significant pressure differential, the improved solenoid valve can still function efficiently and provide significantly better performance than conventional solenoid valves, which will not drain when under suction or when the pressure differential across the valve zero. Air within the primary filter can be expelled using the existing air vent valve.

However, as the improved solenoid fuel drain valve still needs to be operated by the vehicle operator there remains a chance that the operator may forget, or fail to dispose of the water correctly, risking damage to the remainder of the fuel system and the engine, in particular the injector nozzles. Additionally, the solenoid drain valve releases some fuel along with the water, which unless collected and disposed of correctly is a source of pollution.

It is an object of embodiments of the present invention to obviate one or more of the problems associated with the prior art, whether identified herein or elsewhere. In particular, it is an object of embodiments of the present invention to provide a water drain system which is suitable for operating on the suction side of a fuel supply and which eliminates the requirement for the involvement of a vehicle's operator. It is an object of certain embodiments of the present invention to provide such a water drain system suitable for coupling to means for disposing of the water through the vehicle's hydrocarbon (HC) dosing system.

SUMMARY OF THE INVENTION

According to a first aspect of the present invention there is provided a drain system for draining a first liquid, the drain system comprising: a collection vessel having a first chamber arranged to receive the first liquid and a second chamber; two valves positioned between the first chamber and the second chamber arranged such that when the drain system is in an upright position in which the first chamber is above the second chamber the valves comprise a higher valve and a lower valve, the valves having an open configuration in which liquids can pass between the chambers and a closed configuration in which the flow of liquids between the chambers is restricted, the valves being arranged to be in the closed configuration when the pressure in the second chamber exceeds that in the first chamber by more than a first predetermined amount; and a first outlet coupled to the second chamber arranged to allow liquids to flow from the second chamber; wherein when in a first operational mode a first inlet coupled to the second chamber is arranged to supply a second liquid at a pressure higher than that of the first liquid in the first chamber such that the valves are in the closed configuration; and wherein when in a second operational mode the first inlet is arranged to stop supplying the second liquid such that the pressure in the second chamber reduces relative to the first chamber allowing the valves to return to the open configuration.

An advantage of the present invention is that the liquid drain system when coupled to a filter allows the first liquid (which may be water) to be extracted from the filter automatically, thereby eliminating the need for manual draining from the filter. The second chamber is pressurised in the first operational mode by a pressurised source of a second liquid (which may be diesel). The second liquid is the same liquid from which the water is filtered when the liquid drain system is coupled to a filter. When in the second operational mode, and if the liquid drain system is upright with the first chamber above the second chamber, the first liquid will drain into the second chamber and be replaced by the second liquid which rises into the first chamber if the second liquid is less dense than the first liquid.

Each valve may comprise a ball check valve arranged such that when the drain system is in the upright position the balls are biased to fall under gravity in the first and the second liquid such that the valves are in the open configuration. When in the closed configuration each valve may be arranged to permit at least some of the pressurised second liquid to pass from the second chamber to the first chamber.

The first outlet may be arranged such that when the drain system is in the upright position, and when the drain system is in the first operational mode, liquids from the bottom portion of the second chamber are expelled through the first outlet.

According to a second aspect of the present invention there is provided a fuel filter comprising a drain system as described above, wherein the first chamber comprises a sealed chamber having a second inlet and a second outlet, the second inlet and the second outlet being separated within the first chamber by a filter media arranged to allow fuel to pass through and to prevent water from passing through, the fuel filter being arranged such that in use a mixture of fuel and water passes into the first chamber through the second inlet and the filtered fuel passes out of the first chamber through the second outlet, wherein the fuel comprises the second liquid and water comprises the first liquid.

When the drain system is in the upright position and in the second operational mode, and when the fuel is less dense than water, water present in the first chamber may be arranged to pass from the first chamber through the lower valve into the second chamber and fuel present in the second chamber is arranged to pass from the second chamber through the higher valve to the first chamber.

According to a third aspect of the present invention there is provided a fuel supply system comprising a fuel filter as described above and further comprising a pump arranged to receive the filtered fuel from the second outlet, the pump being arranged to pressurise the fuel, the first inlet to the second chamber being coupled to an outlet of the pump such that when in the first operational mode the pump is arranged to supply the pressurised fuel to the first inlet.

The first outlet from the second chamber may be coupled to a control valve such that when in the first operational mode fuel or water present in the second chamber is arranged to be selectively released through the first outlet by control of the control valve, and the control valve may be coupled to a collection vessel such that fuel or water from the second chamber is arranged to be received in the collection vessel.

According to a fourth aspect of the present invention there is provided a vehicle engine comprising a liquid supply as described above, wherein the first outlet from the second chamber is coupled to a control valve forming part of a hydrocarbon dosing system such that when in the first operational mode fuel or water from the second chamber may be selectively released under pressure by control of the control valve through a nozzle into the exhaust.

The first operational mode of the drain system may correspond to the engine running such that pressurised fuel is supplied to the second chamber through the first inlet from an engine fuel line and the second operational mode of the drain system may correspond to the engine being switched off such that pressure in the engine fuel line reduces.

When in the first operational mode a first water sensor may be arranged to detect an excess of water in the second chamber and to pass a control signal to an engine control unit which upon receipt of the control signal is arranged to trigger activation of the hydrocarbon dosing system.

According to a fifth aspect of the present invention there is provided a vehicle comprising a vehicle engine as described above, wherein when in the first operational mode a second water sensor is arranged to detect an excess of water in the first chamber and to pass a signal to an engine control unit which upon receipt of the control signal is arranged provide a warning signal to the operator of the vehicle indicating that the engine should be switched off.

Advantageously, for certain embodiments of the present invention the combination of the liquid drain system and a liquid filter may be made smaller than that for previous filters. When the filter comprises part of a vehicle fuel supply system, the filter and drain system may be smaller than known fuel filters with solenoid fuel drain valves as there is no requirement for a fuel drain valve on the outside of the filter casing which requires access for water collection. This also allows the primary filter to be positioned in more inaccessible positions within the engine bay.

Integration of the water drain system with the hydrocarbon (HC) dosing system to dispose of the water provides a more cost effective solution compared with separate collection and disposal of the water. In particular, there is no requirement for a secondary water collection vessel outside of the primary filter.

According to a sixth aspect of the present invention there is provided a method of draining a first liquid, the method comprising: receiving the first liquid in a first chamber of a collection vessel, the collection vessel having a second chamber below the first chamber and two valves positioned between the first chamber and the second chamber such that a first valve is higher than a second valve, the valves having an open configuration in which liquids can pass between the chambers and a closed configuration in which the flow of liquids between the chambers is restricted, the valves being arranged to be in the closed configuration when the pressure in the second chamber exceeds that in the first chamber by more than a first predetermined amount; supplying, in a first operational mode, a second liquid under pressure to a first inlet coupled to the second chamber such that the valves are in the closed configuration, the second liquid being less dense than the first liquid; ceasing the supply, in a second operational mode, of the second liquid to the first inlet such that the pressure in the second chamber reduces relative to the first chamber allowing the valves to return to the open configuration such that the first liquid passes from the first chamber to the second chamber through the lower valve, and the second liquid passes from the second chamber to the first chamber through the higher valve; and controlling the release of liquids, in the first operational mode, from the second chamber through a first outlet by controlling a control valve coupled to the first outlet.

The first chamber may comprise a sealed chamber having a second inlet and a second outlet, the second inlet and the second outlet being separated within the first chamber by a filter media arranged to allow fuel to pass through and to prevent water from passing through. The method may thus further comprise supplying a mixture of fuel and water into the first chamber through the second inlet; wherein the filtered fuel passes out of the first chamber through the second outlet, and wherein the fuel comprises the first liquid and water comprises the second fluid.

The fuel passing out of the first chamber through the second outlet may pass to a pump. The method, in the first operational mode, may further comprise pressurising the fuel at the pump; and supplying the pressurised fuel to the first inlet.

The control valve may form part of a hydrocarbon dosing system in a vehicle engine such that when in the first operational mode the method may further comprise selectively supplying liquids from the second chamber to a nozzle into the exhaust by control of the control valve.

The first operational mode may correspond to the vehicle engine running such that pressurised fuel is supplied to the second chamber from an engine fuel line. The second operational mode may correspond to the engine being switched off such that pressure in the engine fuel line reduces.

A first water sensor may be arranged to detect whether the amount of water in the second chamber exceeds a predetermined amount such that when in the first operational mode the method may further comprise detecting at the first water sensor an excess of water in the second chamber; passing a control signal from the first water sensor to an engine control unit; and sending a control signal from the engine control unit to the hydrocarbon dosing system to trigger activation of the hydrocarbon dosing system.

A second water sensor may be arranged to detect whether the amount of water in the first chamber exceeds a predetermined amount such that when in the first operational mode the method may further comprise detecting at the second water sensor an excess of water in the first chamber; passing a control signal from the second water sensor to an engine control unit; and sending a warning signal from the engine control unit to the vehicle cabin indicating to the vehicle operator that the engine should be switched off.

Embodiments of the present invention, in particular the method of controlling the liquid drain system may be implemented in software. For example a carrier medium carrying computer readable code for controlling a computer to carry out the above aspects of the invention may be provided. Alternatively, a computer apparatus comprising a program memory storing processor readable instructions and a processor configured to read and execute instructions stored in said program may be provided. The processor readable instructions stored in said program memory may comprise instructions controlling the processor to carry out the above aspects of the invention. The computer apparatus may comprise bespoke hardware. In particular, the computer apparatus arranged to implement the method of the present invention may form part of a conventional or a bespoke engine control unit (ECU).

BRIEF DESCRIPTION OF THE DRAWINGS

The present invention will now be described, by way of example only, with reference to the accompanying drawings, in which.

DETAILED DESCRIPTION OF THE PREFERRED EMBODIMENT

In accordance with embodiments of the present invention there is provided a water drain system suitable for operation on the suction side of a vehicle fuel supply for draining water separated from the fuel supply in a fuel filter. The drained water may be separately stored, returned to the fuel tank or disposed of through HC dosing system or injected into the exhaust through a stand alone solenoid. The HC dosing system injects small quantities of fuel to the exhaust in order to elevate the exhaust temperature to regenerate the diesel particulate filter (DPF).

Advantageously, disposing of the water separated from the fuel supply through the HC dosing system ensures that the water is vaporised, thereby removing the requirement for the water to be stored elsewhere. Furthermore, in accordance with embodiments of the present invention the water drain system eliminates the involvement of the vehicle operator.

The water drain and disposal process is controlled automatically by the engine control unit (ECU). In particular, one or more water sensors may be provided to detect whether water is present in the fuel filter water drain system. The elimination of the involvement of the vehicle operator reduces the possibility that water can re-enter the fuel supply, which could otherwise lead to fuel system failures.

Figure 1:
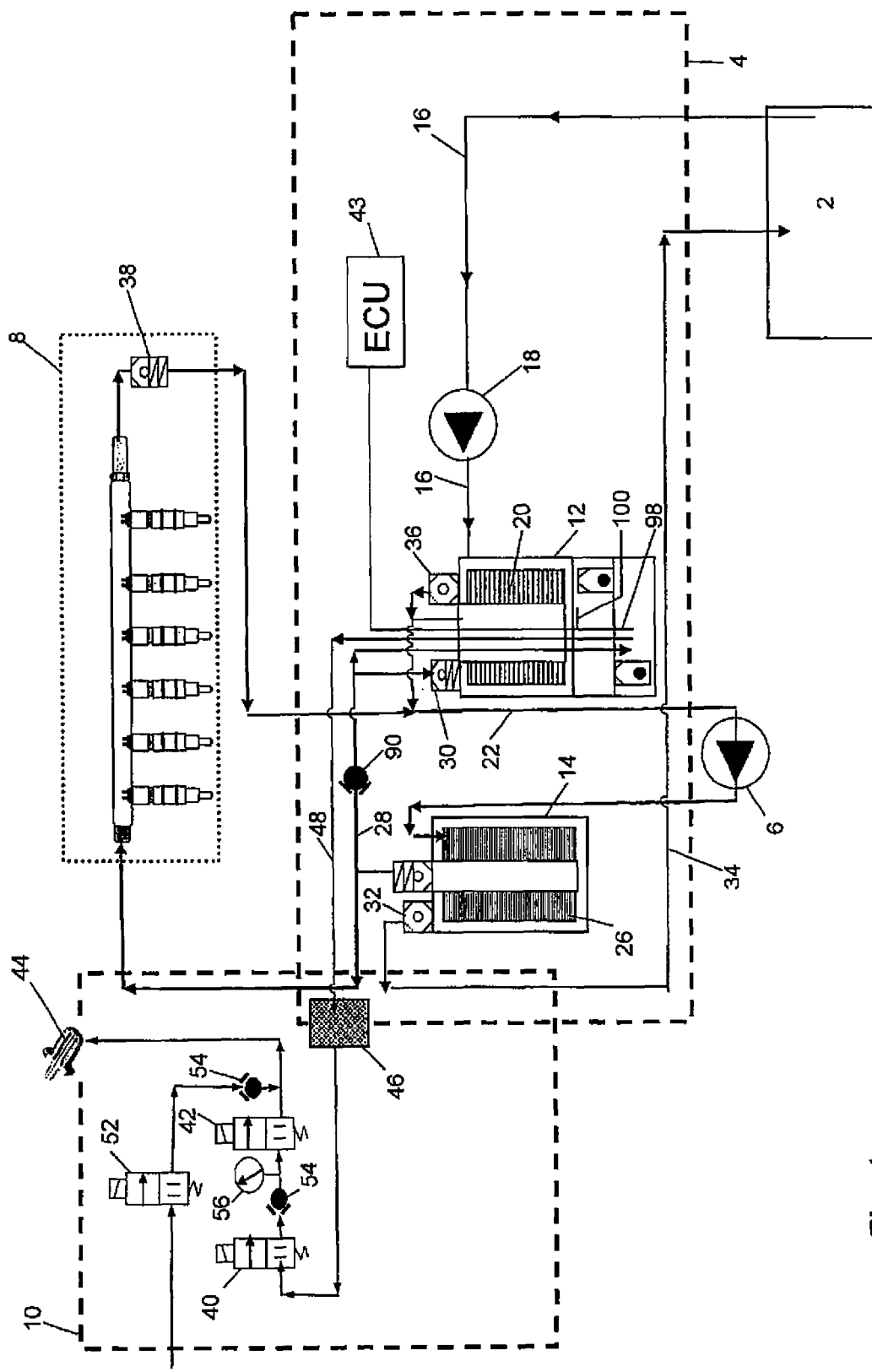
FIG. 1 illustrates a vehicle fuel system including a primary filter incorporating a water drain system in accordance with an embodiment of the present invention.

Referring to FIG. 1, there is illustrated parts of a fuel system for a vehicle, for instance a diesel truck, including a water drain system in accordance with an embodiment of the present invention. The fuel system comprises a fuel tank 2, a filter assembly 4 including the water drain system, a main fuel pump 6, engine gallery 8 and an HC dosing system 10. The filter assembly 4 includes a primary fuel filter 12 and a secondary fuel filter 14. The primary filter 12 is described in greater detail below in connection with FIG. 2.

When the engine is running, fuel passes from the fuel tank 2 along fuel supply line 16 passing through primer pump 18 to the primary fuel filter 12. The primer pump 18 operates only if system is empty or low of fuel. The primer pump is used to fill in the fuel system with diesel before engine can be turned on. Within the primary fuel filter 12 the fuel passes through a filtering material 20 which separates out any water present in the fuel and catches contaminates. In certain embodiments the filtering material 20 is adapted to separate out particles having a diameter greater than 30 μm. The filtered fuel is then drawn from the primary filter 12 along fuel supply line 22 by the main fuel pump 6, which pressurises the fuel and supplies the pressurised fuel to the secondary filter 14 along fuel supply line 24. Within the secondary fuel filter 14 the fuel is passed through a second filtering material 26 to separate out fine particulate contaminants. In certain embodiments the filtering material is adapted to separate out particles having a diameter greater than 2 μm.

The pressurised and filtered fuel exits the secondary fuel filter 14 along the main fuel supply line 28 where it travels to the engine gallery 8 and is combusted in a conventional manner. Additionally, a branch of the main fuel supply line 28 passes to a recirculation valve 30 coupled to the primary filter 12. The recirculation valve 30 serves to pass a small fraction of the pressurised and therefore heated fuel back to the primary filter 12, which assists in raising the temperature of the fuel in the primary filter 12.

The secondary fuel filter 14 further includes an air vent valve 32 which allows any air present in the secondary fuel filter 14 to be returned to the fuel tank 2 along air vent passage 34. Similarly, the primary fuel filter 12 includes an air vent valve 36 which allows any air present in the primary fuel filter 12 to exit the primary fuel filter to the fuel supply line 22 and disposed of through the air vent valve 32. The engine gallery 8 further includes an engine pressure regulation valve 38 which serves to maintain the fuel pressure in the engine gallery 8. Unused fuel exiting the engine gallery 8 via the engine pressure regulation valve 38 is returned to the fuel supply line 22 and passes back to the main fuel pump 6 thereby completing the fuel system loop.

The HC dosing system 10 comprises a sequence of solenoid valves 40, 42 and a nozzle 44 where small quantities of fuel are injected into the exhaust stream of the diesel engine to increase the hydrocarbons in the exhaust. The hydrocarbons pass through a diesel oxidation catalyst elevating the exhaust temperature to actively regenerate the DPF therefore reducing amount of NOx gases in the exhaust. The fuel is sprayed into the exhaust through the nozzle 44 to optimise the burning process. The dosing system 10 may be integrated into the filter assembly 4, or may be separately provided as shown in FIG. 1.

Within the HC dosing system, a first solenoid valve 40 serves to cut off the fuel supply to the dosing system 10. In a conventional engine the fuel supply to the dosing system 10 is derived from the main fuel supply line 28 via filter 46. Alternately filter 46 can be a part of water/fuel outlet 96. However, in accordance with embodiments of the present invention, water and fuel are supplied to the fuel cut off solenoid valve 40 from the water drain system along supply pipe 48 via filter 46, as will be described in greater detail below. The second solenoid valve 42 comprises a dosing valve and is controlled by the engine control unit 43 to control the small quantities of fuel supplied to the nozzle 44. The dosing valve 42 when operating has a duty cycle in which it periodically releases small quantities of fuel. The connections between the engine control unit 43 and the dosing system 10 is not shown in FIG. 1 for clarity and also as they may be entirely conventional. A check valve 54 is provided between the fuel cut off valve 40 and the dosing valve 42 to ensure that fuel or other fluids cannot return from the exhaust if the pressure in the fuel supply to the fuel cut off valve 40 falls. Furthermore, an air purge valve 52 is provided coupled between the dosing valve 42 and the nozzle 44 via a check valve 54 to allow any air present in the dosing system 10 to be released, while preventing any fuel escaping from the dosing system 10 in this way. A pressure sensor 56 is also provided in the dosing system 10. As will be described in connection with FIG. 3, during operation of the HC dosing system 10 the ECU 43 measures the fluid pressure within the dosing system and uses this measurement, together with knowledge of the required flow rate to the nozzle 44, to determine the required duty cycle of the dosing valve 42.

As will be described in greater detail below, water separated from the fuel supply in the primary fuel filter 12 is collected in a chamber coupled to the primary fuel filter 12 and pressurised by the main fuel line 28. The chamber contains a mixture of water and fuel. The pressurised mixture of water and fuel is connected to the solenoid fuel cut off valve 40 of the dosing system 10 along supply line 48. When the dosing system 10 is signalled by the engine control unit 43 to burn fuel, initially water is passed through the fuel cut off valve 40 and the dosing valve 42. Once the water has passed and fuel begins to pass through the dosing valve 42, the dosing system 10 provides a measured amount of fuel to the nozzle 44 before the fuel cut off valve 40 is closed until the next operating cycle. If a dosing cycle has not been performed for a while and water is detected in the chamber coupled to the primary fuel filter 12, a water sensor within the chamber may send a signal to the ECU in order to activate the dosing system 10 to dispose only of a specified amount of water without dosing fuel into the exhaust. This control of the dosing system is performed by the engine control unit 43.

Figure 2:
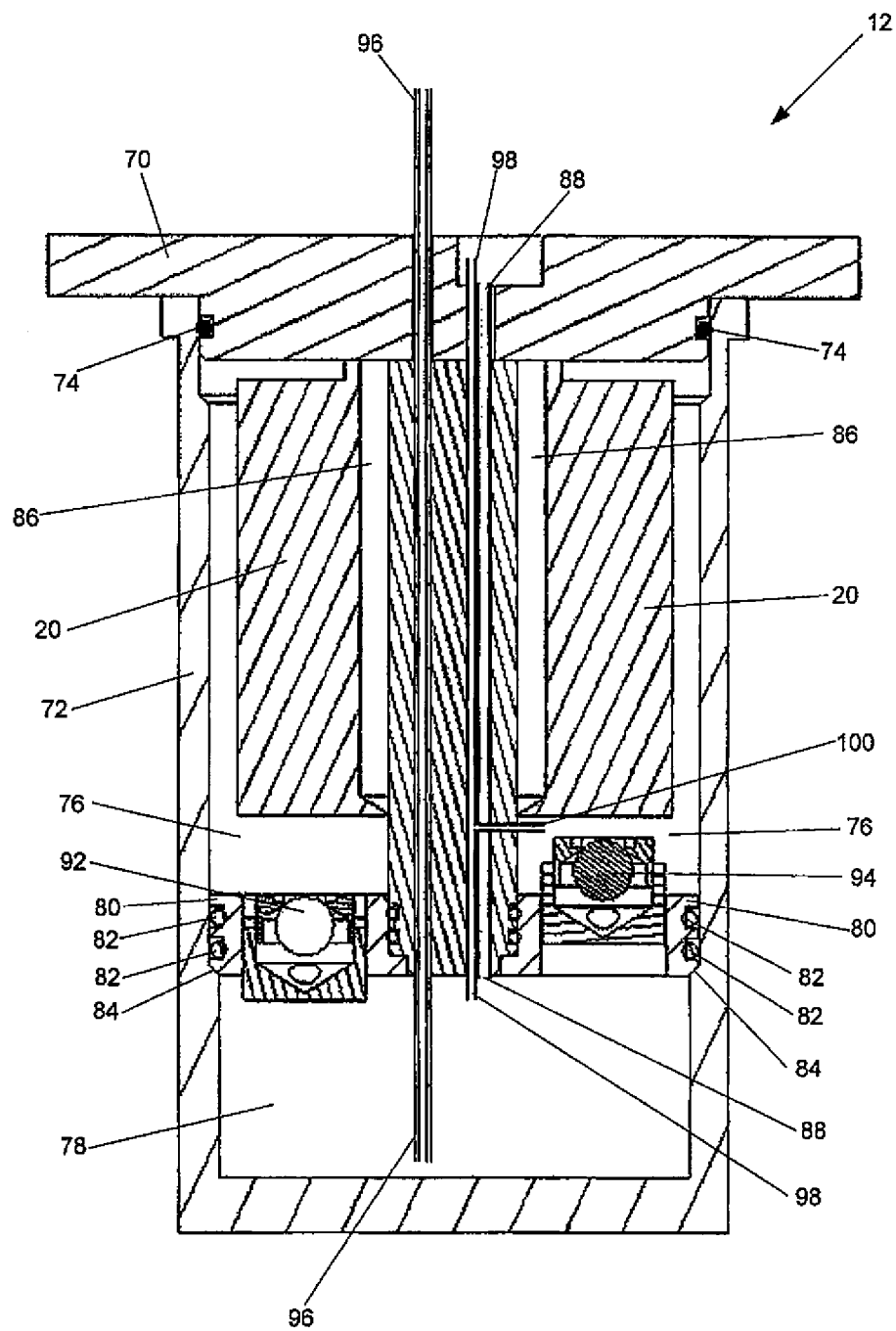
FIG. 2 is a cross sectional view of the primary filter of FIG. 1.

Referring now to FIG. 2, this illustrates in cross section the primary fuel filter 12, and in particular illustrates in greater detail the water drain system of the present invention. As noted above, fuel passes to the primary filter 12 along fuel supply line 16 (not shown in FIG. 2). The primary filter 12 comprises a primary filter head 70 and a bowl 72. The bowl 72 is connected to the primary filter head 70, for instance by a screw threaded coupling, and the two parts are sealed by a gasket 74 to form a sealed container. The sealed container so formed is substantially cylindrical. The bowl 72 is divided into an upper chamber 76 and a lower chamber 78 by a divider 80. The divider 80 is sealed against the inside of the bowl 72 by gaskets 82 and is seated upon a ledge 84 on the inside of the bowl 72.

Fuel passes into the upper chamber 76 through an inlet (not shown in FIG. 2), for instance in top portion 70, and passes through filtering material 20 into a central cavity 86. The filtered fuel then exits the primary filter 12 from the central cavity 86 via an outlet (not shown in FIG. 2) in the top portion primary filter head 70. The fuel is drawn from the primary filter 12 along fuel supply line 22 by the main fuel pump 6. The filtering material 20 separates water and contaminates from the fuel and the separated water collects in the lower part of the upper chamber 76 as it is denser than the fuel.

Divider 80 separates the upper 76 and lower 78 chambers and also separates the suction side of the fuel system (that is, upstream of main pump 6) from the pressure side of the fuel system (downstream of main pump 6). A fuel inlet 88 is connected to the lower chamber 78. Fuel inlet 88 is coupled to the main fuel supply line 28 via a check valve 90 (shown in FIG. 1). When the engine is running, pressurised fuel is supplied to the lower chamber 78 through fuel inlet 88. When the engine stops, the supply of fuel ceases through inlet 88. Check valve 90 prevents fuel from returning to the main fuel supply line 28 in the event that the pressure in the main fuel supply line 28 reduces to a lower pressure than that in the lower chamber 78 of the primary filter 12 (for instance, when the engine is switched off).

Divider 80 incorporates first and second check valves 92, 94. When the engine is running and pressurised fuel is supplied to the lower chamber 78, the pressure in the lower chamber 78 exceeds that in the upper chamber 76. Check valves 92, 94 comprises ball valves and the balls are forced upwards restricting the flow of pressurised fuel into the upper chamber 76. FIG. 2 illustrates the check valves 92, 94 in their restricted position. The balls of the check valves 92, 94 are shown raised up. The check valves 92, 94 may be fully sealed, or they may be arranged to allow a small portion of the pressurised fuel to flow into the upper chamber 76. It can be advantageous to allow this small leak through of pressurised fuel when the engine is running as the pressurised fuel is also heated. The leak through of fuel serves to warm the primary filter 12. Warming the primary filter 12 helps to ensure that fuel runs smoothly in the fuel system particularly during the cold start condition. If such a leak through of fuel is provided, it may be unnecessary to provide the conventional recirculation valve 30.

When the engine is stopped, the supply of pressurised fuel through inlet 88 stops. The pressure in the lower chamber 78 will gradually reduce relative to that of the upper chamber 76. If the check valves 92, 94 are arranged to allow a small amount of leak through fuel this can increase the rate at which the pressure in the upper and lower chambers 76, 78 equalises. Once the pressure in the two chambers 76, 78 is substantially equalised, the check valves 92, 94 open. The situation in which the engine is stopped and the check valves 92, 94 are open is not illustrated in FIG. 2. As water is denser than fuels such as diesel and petrol, once the valves 92, 94 are open water collected in the bottom portion of the upper chamber 76 will flow through the valves 92, 94 into the lower chamber 78 and will be replaced by fuel passing in the opposite direction.

Check valves 92, 94 are vertically offset from one another. This offset assists in the flow of water and fuel as there will be a greater pressure head of water above the lower valve 92 than for the higher valve. Consequently, water will preferentially flow into the lower chamber 78 through valve 92 and fuel will preferentially flow into the upper chamber 76 to replace the water through vale 94.

Each check valve 92, 94 has an effective height on a longitudinal axis extending through the fuel filter 12 defined at the level of the contact between the ball and the valve seat. If the fuel filter is not positioned exactly upright, then the effective height for each valve along the longitudinal axis of the filter may be considered to be the average height of the contact between the ball and the valve seat. The relationship between the vertical offset between the two valves 92, 94 measured along the longitudinal axis of the filter 12, the distance between the centre points of the valves measured in a plane extending perpendicularly to the longitudinal axis of the filter and the gradient of a line extending between the centre points of the valves may be defined mathematically. If the horizontal spacing is A, the vertical offset is B and the gradient of the line extending between the centre points of the valves is $\alpha$ then:

$$\tan\alpha = \frac{B}{A}$$

Positioning the valves 92, 94 closer together increases the gradient of the line extending between the centre points of the valves (that is, $\alpha$ is larger). Similarly, increasing the vertical offset of the valves increases the gradient. However, if the fuel filter 12 is not positioned exactly vertically, the effective vertical offset of valves 92, 94 may vary from the vertical offset B measured along the axis of the filter. For instance, if the vehicle is positioned on a slope then the vertical offset between the valves may vary.

The orientation of the valves 92, 94 around the vertical axis of the filter 12 can also vary the degree to which the effective vertical offset is affected by the slope that the vehicle is positioned on. For instance, if the valves 92, 94 are spaced apart by distance B along an axis which is perpendicular to the direction of motion of the vehicle then the effective vertical offset of the valves is only affected by the camber of the road, and not the slope of the road in the direction of travel of the vehicle. The camber of a road typically has a lower gradient, than the maximum gradient of the road in the direction of travel.

Preferably the gradient $\alpha$ is more than 45° as then it is unlikely that the effective vertical offset of the valves will be reduced or reversed (as this would require the vehicle to be positioned on a slope steeper than 45°). In one embodiment of the present invention the valves have a vertical offset B of 9 mm, and are spaced apart by 50 mm (equally spaced about the centreline of the filter, the filter having a maximum diameter of 110 mm), which equates to a gradient $\alpha$ of approximately 10°. To increase the gradient $\alpha$ to 45° would require the vertical offset B to be increased to 50 mm, which may not be practical as it would increase the size of the filter package.

If the effective vertical offset of the valves is reduced to zero then water is unable to replace the fuel in the lower chamber. In practice, however, it is unlikely that whatever the vertical offset B, the effective vertical offset of the valves will be reduced exactly to zero. If the gradient $\alpha$ is small, then the effect of positioning the vehicle on a steep slope may be to reverse the effective vertical offset of the valves. Consequently, it is desirable that the valves 92, 94 are the same so that water and fuel can flow through either valve. The gradient $\alpha$ may be increased by positioning the valves 92, 94 to one side of the fuel filter (as opposed to either side of the centre fuel line 88) as the valves may then be positioned closer together (reducing the horizontal spacing A).

It is desirable that the openings through valves 92, 94 are sufficiently wide to break the water tension effect, as this would otherwise restrict the flow of water and fuel through the valves.

After the engine has been stopped for a period of time the majority of the water originally present in the upper chamber 76 will have passed to the lower chamber 78. When the engine is restarted, and pressurised fuel is once again passed to the lower chamber 78 through inlet 88, the check valves 92, 94 will be closed and the water is trapped in the lower chamber 78.

As discussed above, water from the primary filter 12 may be disposed of through the HC dosing system 10. A water outlet 96 extends to near the bottom of the lower chamber 78. When the HC dosing system 10 operates water will be drawn from the lower chamber 78 through water outlet 96 (and replaced by pressurised fuel supplied by inlet 88). As outlet 96 extends to near the bottom of the lower chamber 78, substantially all of the water present will be extracted from the lower chamber 78 until fuel (floating on top of the water) begins to flow through the outlet 96. The lower end of the outlet 96 may be protected by a filter to prevent any particulate contaminants being passed to the dosing system. The HC dosing system 10 is arranged to monitor the water/fuel supplied to it along supply line 48 (coupled to outlet 96) until a sufficient quantity of fuel has been injected into the exhaust after the water has passed through. The water passed to the exhaust in this way is vaporised. As discussed above, in alternative embodiments of the present invention, instead of passing water from the lower chamber 78 to a dosing system, the water may periodically be released under the control of a separate valve through outlet 96 (under pressure from the pressurised inlet 88) either to the fuel tank 2 or to another collection vessel for later disposal. Water can also be released into the exhaust through a conventional solenoid valve.

As discussed above, the HC dosing system 10 is controlled by the engine control unit 43 and is arranged to be used periodically to regenerate the DPF. Depending upon the amount of water filtered from the fuel in the primary filter 12, this may be sufficient to keep the amount of water within the lower chamber 78 of the primary filter 12 within acceptable limits. However, it is possible that excessive amounts of water could build up within the lower chamber 78. Therefore, in certain preferred embodiments of the present invention, the water drain system further comprises a water sensor 98 which extends through the primary filter 12 into the lower chamber 78. The water sensor 98 may pass through the same passage through the primary filter 12 as the fuel inlet 88. The water sensor 98 terminates near to the top of the lower chamber 78 such that if the water level within the lower chamber 78 is approaching the top of the lower chamber 78 (that is, the lower chamber 78 is almost full of water) this will be detected by the water sensor 98 and a control signal passed to the engine control unit 43. One or more additional operational cycles of the dosing system 10 may be initiated in order to reduce the amount of water in the lower chamber 78. For such additional operational cycles, the dosing system fuel cut off valve 40 may be arranged to cut off the supply from lower chamber 78 as soon as any fuel starts to be received if there is no current need to regenerate the DPF.

As discussed above, water is transferred from the upper chamber 76 to the lower chamber 78 when the engine is switched off. If the engine has not been switched off for a considerable period of time (or if there is a large amount of water in the fuel supply) then the amount of water in the upper chamber 76 may build up to such a level that it impedes the filtering of the fuel, or even passes through the filtering medium 20 risking damage to the rest of the fuel system. In certain preferred embodiments of the present invention a second water sensor 100 is provided which extends into the upper chamber 76 and is arranged to detect high levels of water within the upper chamber 76. The second water sensor 100 may be completely separate to the first water sensor 98, or it may be collocated with the first water sensor 98, and form a branch away from the first water sensor 98 into the upper chamber 76 (as is shown in FIGS. 1 and 2). If excessive levels of water are present in the upper chamber 76, this is detected by the engine control unit 43 which reads the signal from the second water sensor 100. One possible option to remedy this would be to display a warning light in the vehicle cabin warning the vehicle operator to stop the engine for a predetermined period of time to allow water to drain into the lower chamber 78.

Figure 3:
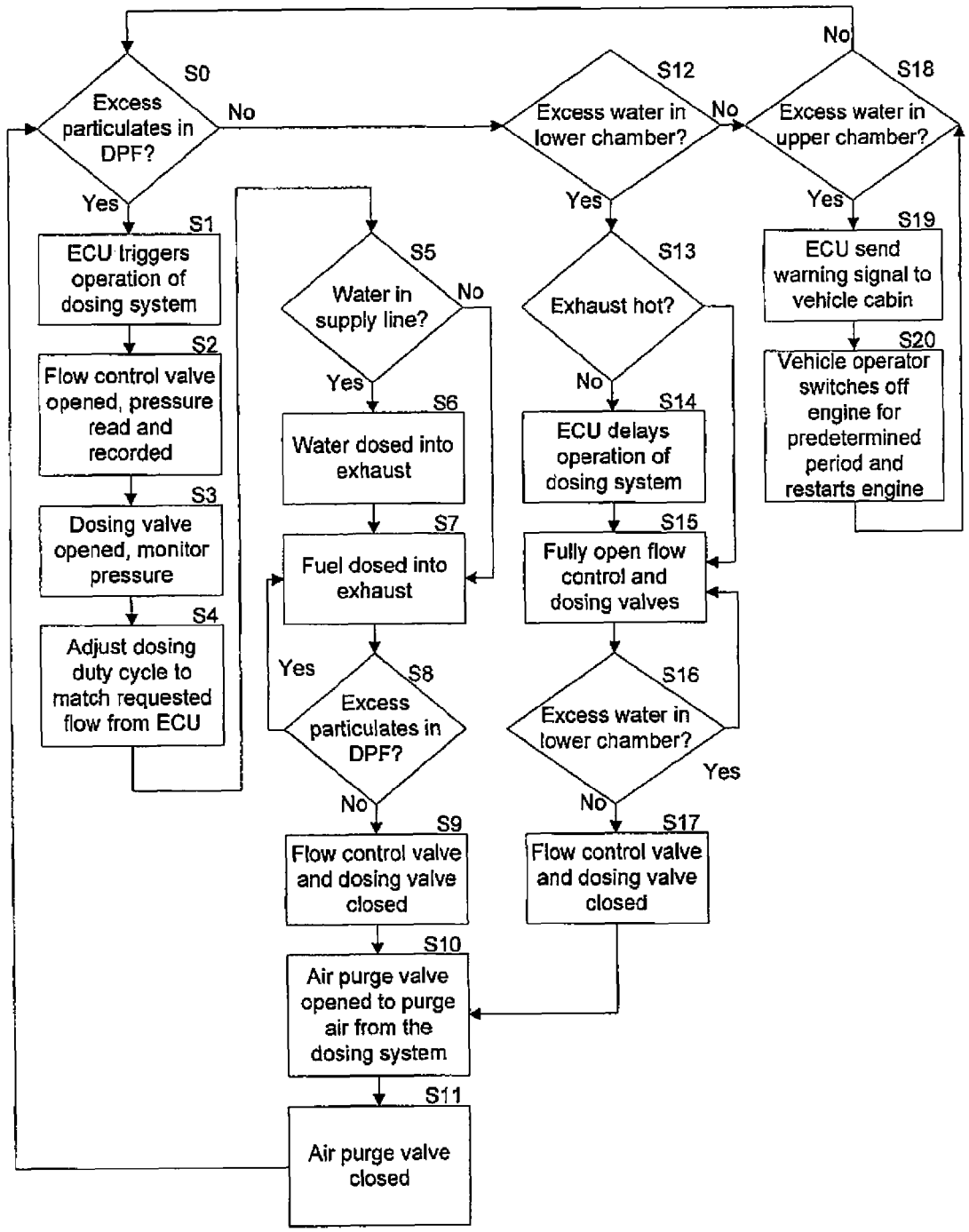
FIG. 3 is a flow chart illustrating the method of operation of portions of the fuel system of FIG. 1.

Referring now to FIG. 3, this schematically illustrates in the form of a flow chart one possible method of operation of the water drain system and the HC dosing system in accordance with the present invention. The HC dosing system is controlled by the engine control unit 43 (ECU). Activation of the dosing system can be triggered by the ECU in accordance with conventional parameters relating to the amount of soot within the diesel particulate filter (DPF) within the exhaust. Alternatively, activation of the dosing system can be triggered by the ECU in response to a control signal from the water sensor indicating that there is excessive water within the lower chamber of the water drain system. FIG. 3 illustrates one embodiment of the invention in which the ECU is arranged to control the dosing system and also arranged to send a warning signal to the vehicle cabin if the water sensor indicates that there is excessive water in the upper chamber.

The flowchart starts at step S0 where the ECU determines whether an excessive level of diesel particulates has built up within the diesel particulate filter within the exhaust. The determination is based upon a control signal provided to the ECU by a conventional pressure sensor, as is known for a DPF. If there is an excess of particulates then this indicates that it is necessary to activate the dosing system to raise the temperature of the exhaust gases to regenerate the DPF. If so, the process passes to step S1 at which point the ECU sends an activation signal to the dosing system.

At step S2 the flow control valve is opened which allows water and fuel to pass to the dosing system from the lower chamber of the water drain system (under pressure from the pressurised fuel supplied to the lower chamber). The pressure of the supplied water and fuel is measured and recorded. At step S3 the dosing valve is opened and the pressure continues to be monitored and passed to the ECU. At step S4 the ECU controls the duty cycle of the dosing valve such that the flow of water and fuel to the exhaust nozzle is set to the desired level, based upon the monitored pressure.

At step S5 a determination is made whether water is being passed to the dosing system. As water is denser than fuel, water and fuel separate within the lower chamber. As the outlet from the lower chamber is towards the bottom of the lower chamber, if there is water present then it will generally be passed to the dosing system before any fuel is supplied to the dosing system, unless there is turbulence within the lower chamber due to movement of the vehicle. If water is present then at step S6 the water is dosed into the exhaust through the nozzle before at step S7 fuel begins to be dosed into the exhaust and combusted. If there is no water present then the process skips from step S5 to step S7.

At step S8 a determination is made as to whether the level of particulates within the diesel particulate filter remains excessive. If so, the process flow returns to step S7. If not, then at step S9 the flow control valve and the dosing valve are closed. At step S10 the air purge valve is opened to remove air from the dosing system before it is closed again at step S11. From step S11 the process flow returns to step S0 for further monitoring of the particulates level within the diesel particulate filter.

If at step S0 it is determined that there is not an excessive level of particulates within the diesel particulate filter, then the process passes to step S12 where a determination is made regarding whether there is an excessive level of water in the lower chamber based upon the control signal passed to the ECU by the lower chamber water sensor. If it is determined that there is water in the lower chamber which needs to be drained then at step S13 the ECU makes a determination as to whether the exhaust is hot enough to vaporise water fed to it. If the exhaust is not sufficiently hot (for instance if the engine has just switched on) then the ECU delays operation of the dosing system at step S14 until the engine has heated up. Otherwise, the process passes straight to step S15.

At step S15 the ECU causes both the flow control valve and the dosing valve to be fully opened. Water under pressure within the lower chamber will be forced out of the inlet, through the dosing system and out the nozzle into the exhaust where it is vaporised. At step S16 the ECU determines whether there is still excess water in the lower chamber. If so, the process returns to step S15. If not, then at step S17 the flow control valve and dosing valve are closed. The process then passes back to steps S10 and S11 for purging air from the dosing system.

If at step S12 it is determined that there is not an excessive amount of water in the lower chamber then the process passes to step S18 where a determination is made regarding whether there is an excessive level of water in the upper chamber based upon the signal passed to the ECU by the upper chamber water sensor. If it is determined that there is not an excessive level of water in the upper chamber then the process returns to step S0 where the ECU once again measures the particulates level in the DPF. However, if excessive water is detected in the upper chamber then at step S19 the ECU sends a warning signal to the vehicle cabin. The vehicle operator upon noticing the warning signal should take the appropriate action as determined by the vehicle manual, for instance switching the engine off for a predetermined period of time at step S20. The process then returns to step S18 where again the ECU checks if there is still an excessive level of water in the upper chamber.

Embodiments of the present invention which have been described above primarily relate to a fuel system in which water from the water drain system is disposed of through a HC dosing system. However, it will be appreciated that the water may be disposed of in any other way. Additionally, the water drain system is described primarily in association with a primary filter within a fuel supply system. However, it will be appreciated that the water drain system may be applicable to any other filtering stage of a fuel supply in which water is separated from fuel and must be disposed of.

Furthermore, the present invention is not limited to filtering water from fuel. Water may be filtered from any other liquid, the only requirement being that the other liquid is less dense than water such that when the check valves are open water can flow from the upper chamber to the lower chamber and be replaced by the other fluid.

The water drain system described above comprises two check valves, which advantageously increases the speed at which water can drain to the lower chamber when the engine is switched off by separating out the return flow of fuel. However, in alternative embodiments there may only be a single valve of sufficient size to allow a bidirectional flow of liquid.

Other modifications and applications of the present invention will be readily apparent to the skilled person from the teaching herein, without departing from the scope of the appended claims.

What is claimed is:

1. A drain system for draining a first liquid, the drain system comprising:
   a collection vessel having a first chamber arranged to receive the first liquid and a second chamber;
   two valves positioned between the first chamber and the second chamber arranged such that when the drain system is in an upright position in which the first chamber is above the second chamber, the valves comprise a higher valve and a lower valve, the valves having an open configuration in which liquids can pass between the chambers and a closed configuration in which the flow of liquids between the chambers is restricted, the valves being arranged to be in the closed configuration when the pressure in the second chamber exceeds that in the first chamber by more than a first predetermined amount; and
   a first outlet coupled to the second chamber arranged to allow liquids to flow from the second chamber;
   wherein when the system is in a first operational mode, a first inlet coupled to the second chamber is arranged to supply a second liquid at a pressure higher than that of the first liquid in the first chamber such that the valves are in the closed configuration; and
   wherein when the system is in a second operational mode, the first inlet is arranged to stop supplying the second liquid such that the pressure in the second chamber reduces relative to the first chamber allowing the valves to return to the open configuration.

2. The drain system of claim 1, wherein each valve comprises a ball check valve arranged such that when the drain system is in the upright position the balls are biased to fall under gravity in the first and the second liquid such that the valves are in the open configuration.

3. The drain system of claim 1, wherein when in the closed configuration, each valve is arranged to permit at least some of the pressurised second liquid to pass from the second chamber to the first chamber.

4. The drain system of claim 1, wherein the first outlet is arranged such that when the drain system is in the upright position, and when the drain system is in the first operational mode, liquids from the bottom portion of the second chamber are expelled through the first outlet.

5. A fuel filter comprising a drain system according to claim 1, wherein the first chamber comprises a sealed chamber having a second inlet and a second outlet, the second inlet and the second outlet being separated within the first chamber by a filter media arranged to allow fuel to pass through and to prevent water from passing through, the fuel filter being arranged such that in use a mixture of fuel and water passes into the first chamber through the second inlet and the filtered fuel passes out of the first chamber through the second outlet, wherein the fuel comprises the second liquid and water comprises the first liquid.

6. A fuel filter according to claim 5, wherein when the drain system is in the upright position and in the second operational mode, and when the fuel is less dense than water, water present in the first chamber is arranged to pass from the first chamber through the lower valve into the second chamber and fuel present in the second chamber is arranged to pass from the second chamber through the higher valve to the first chamber.

7. A fuel supply system comprising a fuel filter according to claim 6, and further comprising a pump arranged to receive the filtered fuel from the second outlet, the pump being arranged to pressurise the fuel, the first inlet to the second chamber being coupled to an outlet of the pump such that when in the first operational mode the pump is arranged to supply the pressurised fuel to the first inlet.

8. A fuel supply system according to claim 7, wherein the first outlet from the second chamber is coupled to a control valve such that when in the first operational mode fuel or water present in the second chamber is arranged to be selectively released through the first outlet by control of the control valve, and wherein the control valve is coupled to a collection vessel such that fuel or water from the second chamber is arranged to be received in the collection vessel.

9. A vehicle engine comprising a fuel filter according to claim 5, wherein the first outlet from the second chamber is coupled to a control valve forming part of a hydrocarbon dosing system such that when in the first operational mode fuel or water from the second chamber may be selectively released under pressure by control of the control valve through a nozzle into the exhaust.

10. A vehicle engine according to claim 9, wherein the first operational mode of the drain system corresponds to the engine running such that pressurised fuel is supplied to the second chamber through the first inlet from an engine fuel line, the second operational mode of the drain system corresponding to the engine being switched off such that pressure in the engine fuel line reduces.

11. A vehicle engine according to claim 9, wherein when in the first operational mode a first water sensor is arranged to detect an excess of water in the second chamber and to pass a control signal to an engine control unit which upon receipt of the control signal is arranged to trigger activation of the hydrocarbon dosing system.

12. A vehicle comprising a vehicle engine according to claim 9, wherein when in the first operational mode a second water sensor is arranged to detect an excess of water in the first chamber and to pass a signal to an engine control unit which upon receipt of the control signal is arranged provide a warning signal to the operator of the vehicle indicating that the engine should be switched off.

13. A method of draining a first liquid, the method comprising:
   receiving the first liquid in a first chamber of a collection vessel, the collection vessel having a second chamber below the first chamber and two valves positioned between the first chamber and the second chamber such that a first valve is higher than a second valve, the valves having an open configuration in which liquids can pass between the chambers and a closed configuration in which the flow of liquids between the chambers is restricted, the valves being arranged to be in the closed configuration when the pressure in the second chamber exceeds that in the first chamber by more than a first predetermined amount;
   supplying, in a first operational mode, a second liquid under pressure to a first inlet coupled to the second chamber such that the valves are in the closed configuration, the second liquid being less dense than the first liquid;
   ceasing the supply, in a second operational mode, of the second liquid to the first inlet such that the pressure in the second chamber reduces relative to the first chamber allowing the valves to return to the open configuration such that the first liquid passes from the first chamber to the second chamber through the lower valve, and the second liquid passes from the second chamber to the first chamber through the higher valve; and
   controlling the release of liquids, in the first operational mode, from the second chamber through a first outlet by controlling a control valve coupled to the first outlet.

14. The method of claim 13, wherein the first chamber comprises a sealed chamber having a second inlet and a second outlet, the second inlet and the second outlet being separated within the first chamber by a filter media arranged to allow fuel to pass through and to prevent water from passing through, the method further comprising:
   supplying a mixture of fuel and water into the first chamber through the second inlet;
   wherein the filtered fuel passes out of the first chamber through the second outlet, and wherein the fuel comprises the first liquid and water comprises the second fluid.

15. The method of claim 14, wherein the fuel passing out of the first chamber through the second outlet passes to a pump, the method, in the first operational mode further comprising:
   pressurising the fuel at the pump; and
   supplying the pressurised fuel to the first inlet.

16. The method of claim 15, wherein the control valve forms part of a hydrocarbon dosing system in a vehicle engine such that when in the first operational mode the method further comprises:
   selectively supplying liquids from the second chamber to a nozzle into the exhaust by control of the control valve.

17. The method of claim 16, wherein the first operational mode corresponds to the vehicle engine running such that pressurised fuel is supplied to the second chamber from an engine fuel line, the second operational mode corresponding to the engine being switched off such that pressure in the engine fuel line reduces.

18. The method of claim 16, wherein a first water sensor is arranged to detect whether the amount of water in the second chamber exceeds a predetermined amount such that when in the first operational mode the method further comprises:
   detecting at the first water sensor an excess of water in the second chamber;
   passing a control signal from the first water sensor to an engine control unit; and
   sending a control signal from the engine control unit to the hydrocarbon dosing system to trigger activation of the hydrocarbon dosing system.

19. The method of claim 16, wherein a second water sensor is arranged to detect whether the amount of water in the first chamber exceeds a predetermined amount such that when in the first operational mode the method further comprises:
   detecting at the second water sensor an excess of water in the first chamber;
   passing a control signal from the second water sensor to an engine control unit; and
   sending a warning signal from the engine control unit to the vehicle cabin indicating to the vehicle operator that the engine should be switched off.

* * * * *